(12) United States Patent
Adriaen et al.

(10) Patent No.: US 7,227,319 B2
(45) Date of Patent: Jun. 5, 2007

(54) METHOD FOR DRIVING A MACHINE AND DRIVE FOR SAID MACHINE

(75) Inventors: Marc Adriaen, Hollebeke (BE); Andre Vandenbroucke, Menen (BE); Chris Noppe, Ingelmunster (BE)

(73) Assignee: Picanol N.V., Ieper (BE)

( * ) Notice: Subject to any disclaimer, the term of this patent is extended or adjusted under 35 U.S.C. 154(b) by 325 days.

(21) Appl. No.: 10/490,389

(22) PCT Filed: Sep. 20, 2002

(86) PCT No.: PCT/EP02/10614

§ 371 (c)(1),
(2), (4) Date: Sep. 10, 2004

(87) PCT Pub. No.: WO03/032481

PCT Pub. Date: Apr. 17, 2003

(65) Prior Publication Data

US 2006/0244402 A1    Nov. 2, 2006

(30) Foreign Application Priority Data

Oct. 4, 2001  (DE)  ................................ 101 49 756

(51) Int. Cl.
*H02K 7/14* (2006.01)
(52) U.S. Cl. .................. 318/3; 318/9; 318/14; 318/432
(58) Field of Classification Search .................... 318/3, 318/9, 14, 432, 434, 561, 671
See application file for complete search history.

(56) References Cited

U.S. PATENT DOCUMENTS 4,980,623 A * 12/1990 Anton ......................... 318/432
5,306,993 A    4/1994 De Fries et al.
5,530,333 A    6/1996 Turner
5,559,412 A * 9/1996 Schuler ....................... 318/561
5,755,267 A * 5/1998 Eberhard et al. ........... 139/1 E
5,857,496 A    1/1999 Brown et al.
5,862,835 A * 1/1999 Hellstrom ................... 139/1 E
6,307,340 B1  10/2001 Wagner et al.
6,525,496 B1 * 2/2003 Bilcke ........................ 318/432

FOREIGN PATENT DOCUMENTS

| DE | 199 14 131 | 10/2000 |
| EP | 0 198 248 | 10/1986 |
| EP | 0 635 931 | 1/1995 |
| EP | 0 802 270 | 10/1997 |
| WO | WO 99/27426 | 6/1999 |

* cited by examiner

*Primary Examiner*—Rina Duda
(74) *Attorney, Agent, or Firm*—Bacon & Thomas, PLLC

(57) ABSTRACT

A drive system for a machine, in particular a weaving machine, is designed in a manner such that controlled electric power is applied to a rotary electric drive motor (2) as a function of particular angular positions of the motor and such that electrical energy applied to the motor is reduced or interrupted during phases of increasing angular speed of the motor. Phases of increasing angular speed are detected by the drive system to determine phases of increasing angular speed. A method for controlling an electrical motor drive system using a switchable reluctance motor to reduce or interrupt electrical energy supplied to the motor based on motor speed increases as a function of motor angular position is also disclosed.

11 Claims, 2 Drawing Sheets

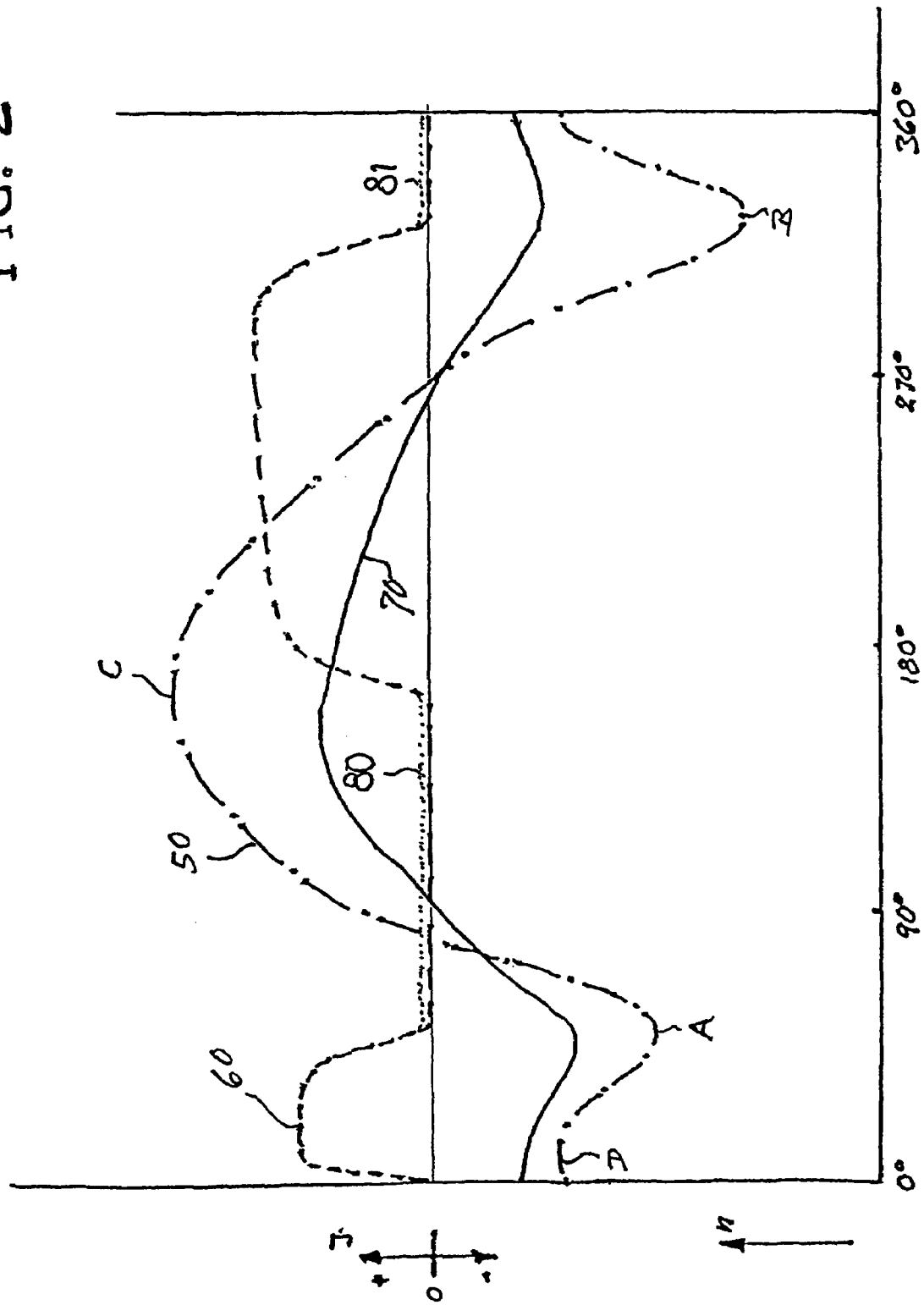

Figure 1:
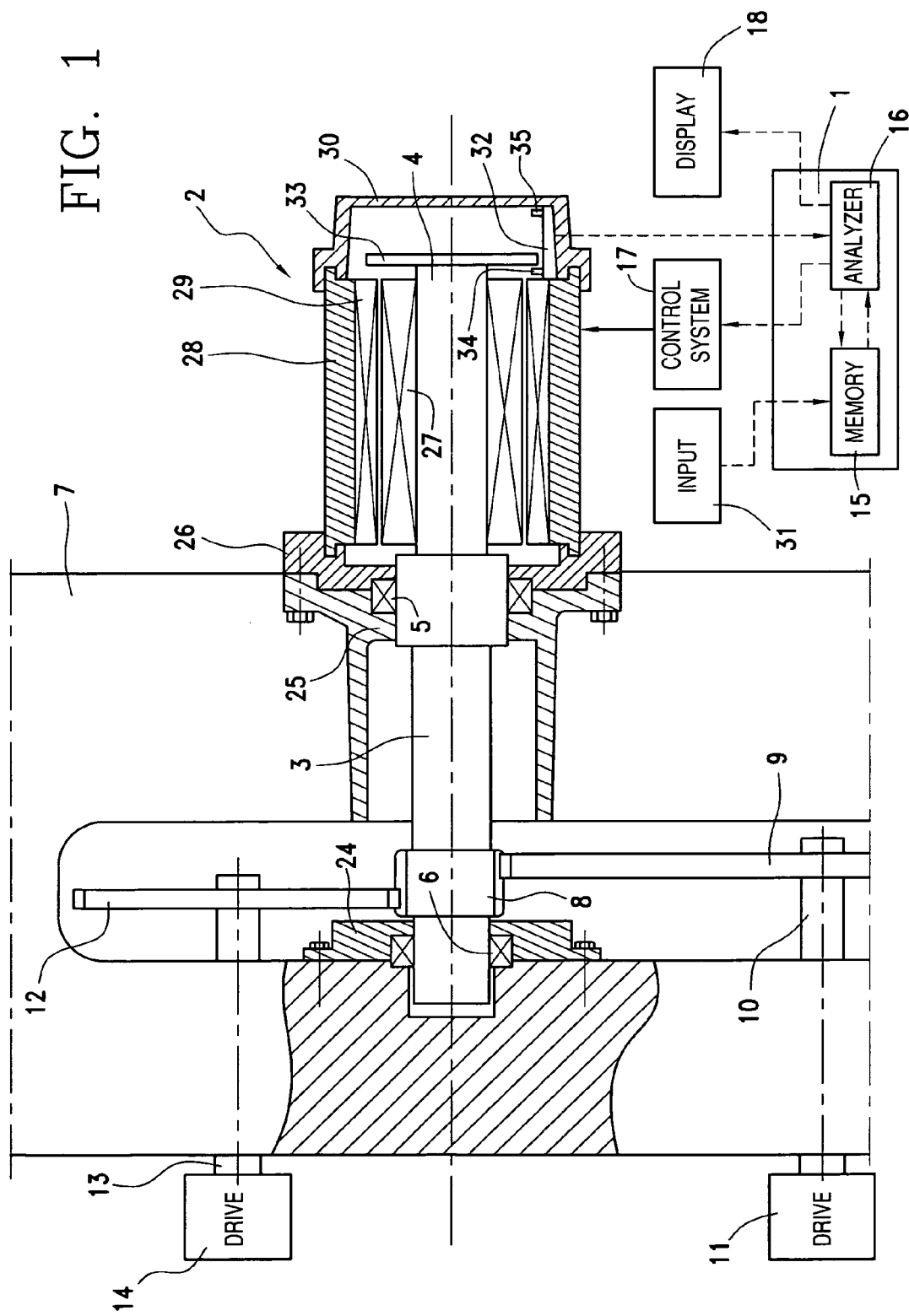

METHOD FOR DRIVING A MACHINE AND DRIVE FOR SAID MACHINE

BACKGROUND OF THE INVENTION

A. Field

The present invention relates to a method for driving a machine comprising at least one periodically moving part and including an electric drive motor which is electrically powered as a function of its specific angular position. The invention also relates to a drive system fitted with a control unit for an electric drive motor.

B. Related Art

A method and a drive system of the above-mentioned kind are known from WO 99/27 426. Because the drive motor continuously applies a preferably constant torque to the described machine the angular speed of the drive motor is a function of said machine's moments of inertia. When said moments of inertia result in speed reduction, the motor adopts the same behavior—just as when the moment of inertia leads to an increase of motor speed. As a result, the fluctuations of the motor's angular speed are exaggerated. In general, such phenomena do not degrade machine operation, for example, as regards the operation of a weaving machine. However there may be a danger that speeds and/or accelerations will be excessive and that damage would follow. There is also a further danger that the speed of the machine will fluctuate so much that synchronization will be lost, for instance with respect to filling insertion with shed formation in air jet looms.

BRIEF SUMMARY OF THE INVENTION

The objective of the present invention is to develop a method of the above kind for reducing the fluctuations in machine angular speed without thereby degrading the efficiency of applied electrically energy.

This problem is solved in that the application of electrical power to the machine drive motor is substantially reduced or interrupted during phases of increasing angular speed.

Because the applied power during phases of increasing speeds will be substantially reduced or interrupted, the overall speed will rise less. The lower increase of angular speed also produces the result that the speed will not decrease to very low values either, so that, on the whole, the angular speed fluctuations will be reduced.

The design problem of a drive system is solved in the present invention by fitting the control unit with devices detecting phases of increasing angular speed and reducing or interrupting the applied power during said phases.

Further features and advantages of the present invention are discussed in the following description and in the dependent claims.

FIG. 1 schematically shows a weaving machine drive system controlled in the manner of the present invention, and FIG. 2 is a plot showing the course of the said machine's angular speed during one revolution and the controlled application of electrical power to the drive motor.

DETAILED DESCRIPTION OF PREFERRED EMBODIMENTS OF THE INVENTION

The drive system of a weaving machine shown in FIG. 1 includes a control unit 1 controlling a drive motor 2. The drive motor 2 drives the weaving machine's main drive shaft 3. In this embodiment, the motor drive shaft 4 and the main drive shaft 3 are integral. The main drive shaft 3 rests in bearings 5, 6 in a weaving machine frame 7.

A switching gear 8 meshing with a drive gear 9 is irrotationally affixed to the main drive shaft 3. The drive gear 9 is irrotationally affixed on a shaft 10 actuating first drive element 11, for example, comprising shed-forming drive elements. The switching gear 8 moreover engages a second drive gear 12 irrotationally affixed on a drive shaft 13 actuating second drive elements 14 which, for example, are the drive elements of a batten or, in a gripper loom, are drivers for the grippers.

To keep the drive torque acting on the main drive shaft 3 within bounds, the diameter of the switching gear 8 is less than that of the drive gears 9, 12. The drive gear 12 rotates through one revolution per filling insertion. At the same time, the drive element drive gear 9 illustratively will rotate only through half a revolution because the shed forming devices will only pass through half a cycle per filling insertion. Therefore the diameter of the drive gear 9 is designed to be twice that of the drive gear 12.

The bearing 6 is mounted between the weaving machine frame 7 and a flange 24 bolted onto said frame. The bearing 5 is mounted between a flange 25 which is part of the weaving machine frame 7 and a flange 26 bolted onto said frame. The rotor 27 of the drive motor 2 is irrotationally affixed to the motor shaft 4 which—as mentioned above—is integral with the main drive shaft 3. The stator 29 of the drive motor 2 is received in a housing 28 and is affixed by the flange 26 to the weaving machine frame 7. For that purpose the housing 28 is fitted with a thread entering the flange 26. The flange 26 keeps the stator 29 centered relative to the rotor 27. The housing 28 comprises a second threaded end receiving a second threaded flange 30 which seals the end face of the drive motor 2 against dust. The drive motor 2 preferably will be a switchable reluctance motor designed to connect a given winding to the power source at each angular position in order to apply a controlled electric supply to said motor, that is, the power shall be controlled with respect to amplitude and frequency.

The control unit 1 contains at least one memory 15 and one analyzer 16. An input unit 31, a display 18 and a sensor 32 are connected to the control unit 1. The sensor 32 cooperates with an encoding disk 33 mounted on the motor shaft 4. In one embodiment, the encoding disk 33 and the sensor 32 are mounted on the main drive shaft 3 of the weaving machine. The control unit detects the angular position and angular speed of the motor shaft 4 by means of the signals transmitted by the sensor 32. Illustratively the sensor 32 includes a light emitter 34 and a pickup configured on the other side of the encoding disk 33. This encoding disk is fitted at specified light transmitting sites to allow the light from the light emitter 34 to reach the detector 35. It is understood that other sensors operating on different principles also may be used.

The application of electric power to the drive motor 2 is controlled from the control unit 1 by means of a control system 17. Illustratively this control system 17 is an electronically regulated current or power source which independently of load may apply power of preselected amplitude and preselected frequency.

If the drive motor 2 is driven in the manner described in WO 99/27 426, for instance in such a manner that it shall continuously apply a constant torque to the weaving machine, the result will be an angular speed variation over 360° as shown by the curve 50 of FIG. 2. The curve 50 makes it obvious that the fluctuation in angular speed is comparatively substantial. This peculiarity comes about because the drive motor 2 tracks the speed variation determined by the weaving machine's moment of inertia and will amplify said variation. The invention decreases these angular speed fluctuations by interrupting the application of power during those phases when motor angular speed increases. These phases start at peaks A and B of curve 50. The power supply is applied anew at the peaks C and D where the angular speed function reverses again, that is, the angular speed decreases again. The applied power function is shown in FIG. 2 by a curve 60. Consequently the angular speed fluctuations may be reduced considerably, as indicated by the curve 70 of FIG. 2. As shown in FIG. 2, the power supply is shut off at the peaks A and B not abruptly, but gradually. Therefore the transition is smooth, that is, free of impulses. The new application of power also is gradual, and again smooth transitions are attained. Appropriately, the power supply is shut off before the lower peaks A and B of the angular speed shown by curve 50 have been reached. Again the power supply will be re-applied appropriately in a manner before the upper peaks have been reached. Be it noted in this respect that the interruption of the power supply and its re-application need not rigorously coincide with the peaks A, B, C and D. Even if deviations were incurred, for instance if interruption and/or re-application were to take place too early or belatedly, no significant flaws would have to be dealt with. Even in such instances significant reduction of angular speed fluctuations would be attained. Because the power supply is interrupted when the angular speed of the drive motor 2 rises, when it shall drop, more power will then have to be applied in order to attain a given average speed, the energy consumption as a whole being the same. Accordingly the present invention constrains the applied energy within a maximum value.

To detect the phases at which the angular speed increases, corresponding angles of rotation are stored in the memory. This process is carried by turning on the weaving machine and operating it at a predetermined speed. Then the power supply is totally shut off, as a result of which the said machine operates at its "natural" angular speeds, that is with speed variations absent supply of power. These speed variations are stored in a microprocessor as a standard or nominal course for the "natural" angular speed variations. Simultaneously data are being stored in said microprocessor which represent the peaks A, B, C and D, where the angular speeds reverse, i.e. the angular speeds rise and drop.

Thereupon the weaving machine is started in the manner described in WO 99/27 426. The microprocessor will control the power applied to the drive motor 2 in a manner such that the angular speed course shall correspond to the standard angular speed course. The applied power is then interrupted in the regions of the peaks A and B, preferably somewhat in advance. The angular positions at which shutoff and subsequently re-application of power application are definitively fixed may be corrected by checking the angular speed course and comparing them with the standard speed course. However, since the applied energy is constrained by a maximum value, there will be some deviations between the standard angular speed course and the actual angular speed course. Accordingly, in a preferred implementation of the present invention, the control function is designed in a manner such that following a given weaving time, the ascertained value of angular speed course shall be considered as the new "natural" angular speed course. In this way accurate regulation relating to this corrected angular speed course shall be attained. Thereupon the control procedure easily may merge into the method described in WO 99/27 426. In that case the data are stored in a way such that the drive motor 2 is controlled in relation to a predetermined torque to be applied to the machine. For further reliability, changes in angular speed also may be detected and, in the event a threshold value of angular speed changes is exceeded, the control operation may return to the above discussed speed regulation. This procedure is advantageous for the control microprocessor which then need not continuously calculate the power values to be applied but instead may use stored values.

It is understood that the above discussed speed regulation is not mandatory and that only the applied torque control according to WO 99/27 426 may be used, provided however that the power supply be interrupted during phases of rising angular speeds.

Reduction of fluctuations in angular speed may also be attained in other ways than by interrupting the electric power at each phase range of increasing angular speed. Said fluctuations already are reduced if the application of electrical power is interrupted during part of a range of phases of increasing angular speed rather than during the entire phase. Again, and vice-versa, it is not mandatory that power be applied always and during the full phases of decreasing speed.

As shown in FIG. 2 by the dotted lines 80 and 81, the desired result of the invention already shall be attained when the applied power is not entirely interrupted at the peaks A and B, instead being only considerably reduced, namely to less than 20% and preferably to less than 10 to 5%.

The invention claimed is:

1. A method for driving a machine comprising at least one periodically moving part and including an electric drive motor which is a switchable reluctance motor to the windings of which electrical energy may be supplied in a controlled manner according to the respective angular position of the motor to rotate with variable rotating speed as a function of the periodical movement of the at least one periodically moving part, for which purpose angular positions of the drive motor are acquired and the windings are supplied with energy controlled in relation to the respective angular position, wherein first a speed course of the machine is acquired as a standard curve for the natural angular speed of the machine and data are stored representing the peaks of the natural angular speed, and then phases of increasing angular speed are acquired from that standard curve, and wherein for the duration of the phases of increasing angular speed, electrical energy supply to the motor is interrupted or reduced to a constant value.

2. Method as claimed in claim 1, wherein the phases of increasing angular speed are stored as angular positions in a control unit.

3. Method as claimed in claim 1, wherein the phases of increasing angular speed are ascertained while the machine operates after interruption of applied electrical energy.

4. Method as claimed in claim 3, wherein the interruption of applied electrical energy is gradual.

5. Method as claimed in claim 1, wherein the re-application of electrical energy after interruption of same is gradual.

6. Method as claimed in claim 1, wherein the application of electrical energy is limited to a maximum value.

7. Method as claimed in claim 1, wherein applied electrical energy follows a nominal angular speed variation.

8. Method as claimed in claim 1, wherein electrical energy applied to the drive motor follows a natural course of torque output of the motor.

9. A drive system for a machine comprising at least one periodically moving part and including an electric drive motor which is electrically powered by means of a control unit as a function of a respective angular position, wherein the control unit comprises devices detecting phases of increasing angular speed and devices to substantially reduce or interrupt electrical energy supplied to the electric drive motor within said phases.

10. Drive system as claimed in claim 9, wherein the control unit includes a memory storing data of the phases of increasing angular speed.

11. Drive system as claimed in claim 9, wherein the control unit includes a memory arranged to store data of angular positions and the corresponding natural course of at least one of torque to be applied and the electrical energy which will be applied to the drive motor corresponding to a natural course of the angular speed.

* * * * *